(12) United States Patent
Wang et al.

(10) Patent No.: US 10,692,260 B2
(45) Date of Patent: Jun. 23, 2020

(54) SYSTEM AND METHOD FOR GENERATING DIGITAL CONTENT FOR A COMPOSITE CAMERA

(71) Applicants: Anhui Huami Information Technology Co., Ltd., Hefei, Anhui (CN); Huami Inc., Mountain View, CA (US)

(72) Inventors: Kongqiao Wang, Anhui (CN); Xiao-feng Li, Mountain View, CA (US); Yajun Zhao, Anhui (CN); Wang Huang, Hefei (CN)

(73) Assignees: Anhu Huami Information Technology Co., Ltd., Hefei, Anhui (CN); Huami Inc., Mountain View, CA (US)

( * ) Notice: Subject to any disclaimer, the term of this patent is extended or adjusted under 35 U.S.C. 154(b) by 578 days.

(21) Appl. No.: 15/427,771

(22) Filed: Feb. 8, 2017

(65) Prior Publication Data
US 2018/0211428 A1 Jul. 26, 2018

Related U.S. Application Data

(63) Continuation of application No. PCT/US2017/014567, filed on Jan. 23, 2017.

(51) Int. Cl.
*G06T 11/60* (2006.01)
*G06T 3/40* (2006.01)
(Continued)

(52) U.S. Cl.
CPC ............ *G06T 11/60* (2013.01); *G06T 3/4038* (2013.01); *G06T 7/70* (2017.01); *H04N 5/23238* (2013.01);
(Continued)

(58) Field of Classification Search
CPC ..... G06T 7/70; G06T 3/4038; H04N 5/23238; H04N 5/247
See application file for complete search history.

(56) References Cited

U.S. PATENT DOCUMENTS

2006/0274972 A1  12/2006  Peterson
2014/0016016 A1  1/2014  Berestov et al.
(Continued)

FOREIGN PATENT DOCUMENTS

WO   2012008856 A1   1/2012

OTHER PUBLICATIONS

Casio EX-FR200 camera with detachable lens unit. https://www.dpreview.com/news/7409344788/casio-launches-rugged-ex-fr200-camera-with-free-range-lens-unit. 6 pages.
(Continued)

*Primary Examiner* — Edward Park
(74) *Attorney, Agent, or Firm* — Young Basile Hanlon & MacFarlane, P.C.

(57) ABSTRACT

A method includes: receiving sensor data representing a subject within a field of vision associated with respective ones of a plurality of modular cameras associated with a composite camera and one or more geo-spatial characteristics associated with respective ones of the plurality of modular cameras; determining an arrangement of the composite camera based on the sensor data; generating digital content for respective ones of the plurality of modular cameras based on the sensor data; and generating combined digital content that represents a subject within a field of vision associated with the composite camera based on the digital content and the arrangement of the composite camera, wherein the field of vision associated with the composite camera includes at least some of fields of vision associated with the plurality of modular cameras.

20 Claims, 9 Drawing Sheets

(51) Int. Cl.
      *H04N 5/232*     (2006.01)
      *G06T 7/70*       (2017.01)
      *H04N 5/247*     (2006.01)

(52) U.S. Cl.
      CPC ... *H04N 5/247* (2013.01); *G06T 2207/10004* (2013.01); *G06T 2207/10016* (2013.01); *G06T 2207/20221* (2013.01)

(56) References Cited

U.S. PATENT DOCUMENTS

| | | | |
|---|---|---|---|
| 2014/0267775 A1* | 9/2014 | Lablans | H04N 5/247 348/169 |
| 2015/0180986 A1 | 6/2015 | Bisdikian et al. | |
| 2015/0350542 A1 | 12/2015 | Steuart, III | |
| 2016/0012589 A1 | 1/2016 | Hamer et al. | |
| 2019/0180413 A1* | 6/2019 | Sugaya | H04N 5/232 |

OTHER PUBLICATIONS

International Search Report dated Oct. 20, 2020 in corresponding PCT/US2017/014567.

* cited by examiner

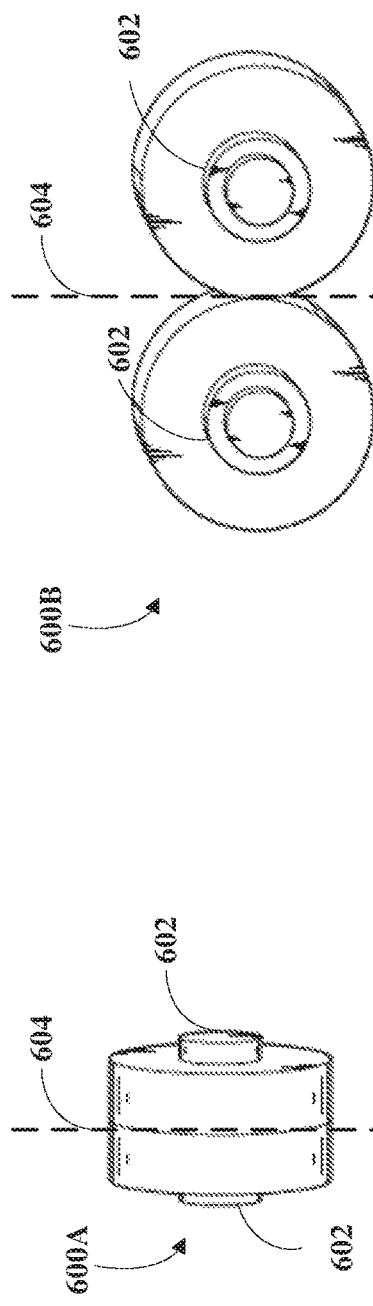
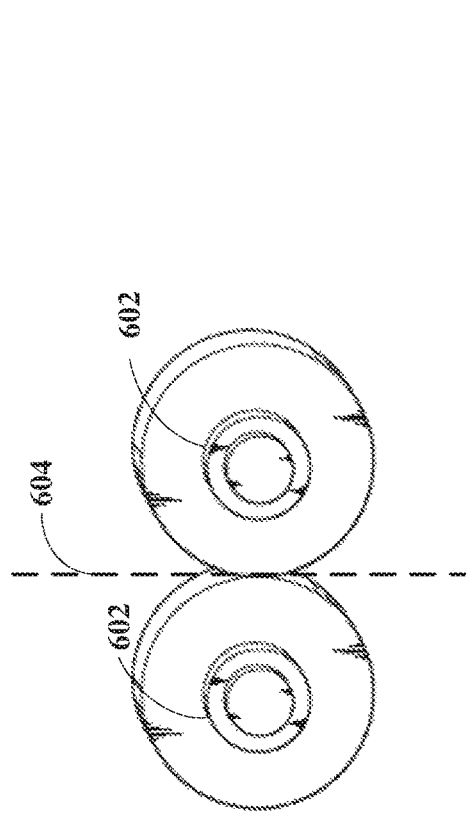
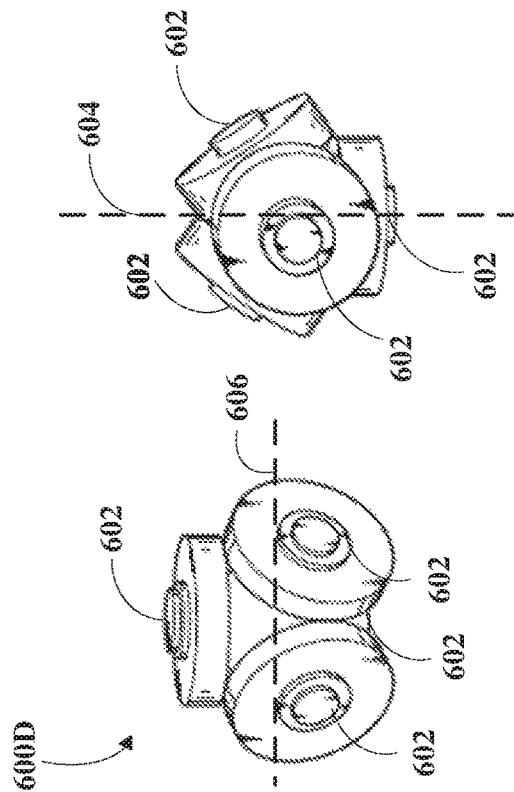
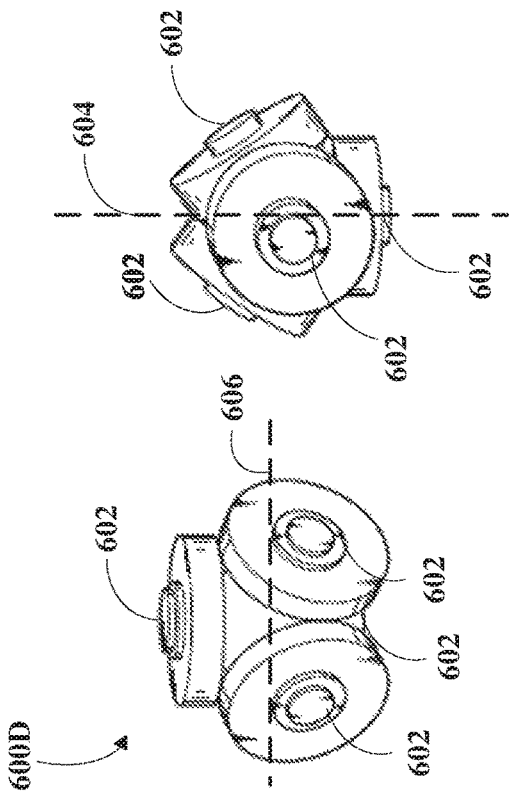
FIG. 6A
FIG. 6B
FIG. 6C
FIG. 6D

SYSTEM AND METHOD FOR GENERATING DIGITAL CONTENT FOR A COMPOSITE CAMERA

CROSS-REFERENCE TO RELATED APPLICATION(S)

This application is continuation of PCT Application No. PCT/US2017/14567 filed on Jan. 23, 2017, the entire disclosure of which is hereby incorporated by reference.

TECHNICAL FIELD

This disclosure relates to systems, methods, and apparatuses for generating digital content for a composite camera.

BACKGROUND

Cameras, such as digital modular cameras may be used to capture visual and/or acoustic aspects of a subject within a field of vision associated with a modular camera. A composite camera may include two or more modular cameras composed such one modular camera associated with the composite camera may capture a first perspective of visual and/or acoustic aspects of a subject within a field of vision of the composite camera and another modular camera may capture a second perspective of visual and/or acoustic aspects of the subject within the field of vision of the composite camera. The composite camera may stitch together the first and second perspectives of the visual and/or acoustic aspects of the subject based on a composition, arrangement, or position, of the modular cameras. However, an arrangement of the modular cameras may be unknown and/or subject to adjustment by a user of the composite camera. Accordingly, it may be desirable to dynamically determine the arrangement of the composite camera.

SUMMARY

Disclosed herein are aspects, features, elements, embodiments, and implementations of systems and methods for generating digital content for a composite camera.

In an aspect, an apparatus for generating digital content may include a composite camera that includes a plurality of modular cameras, and a processor configured to execute instructions stored on a non-transitory computer readable medium to: receive sensor data representing a subject within a field of vision associated with respective ones of the plurality of modular cameras and one or more geo-spatial characteristics associated with respective ones of the plurality of modular cameras; determine an arrangement of the composite camera based on the sensor data that represents the one or more geo-spatial characteristics associated with the respective ones of the plurality of modular cameras; generate digital content for respective ones of the plurality of modular cameras based on the sensor data that represents a subject within a field of vision associated with the respective ones of the plurality of modular cameras; and generate combined digital content that represents a subject within a field of vision associated with the composite camera based on the digital content and the arrangement of the composite camera, wherein the field of vision associated with the composite camera includes at least some of fields of vision associated with the plurality of modular cameras.

In another aspect, a method for generating digital content may include: receiving sensor data representing a subject within a field of vision associated with respective ones of a plurality of modular cameras associated with a composite camera and one or more geo-spatial characteristics associated with respective ones of the plurality of modular cameras; determining an arrangement of the composite camera based on the sensor data that represents the one or more geo-spatial characteristics associated with the respective ones of the plurality of modular cameras; generating digital content for respective ones of the plurality of modular cameras based on the sensor data that represents a subject within a field of vision associated with the respective ones of the plurality of modular cameras; and generating combined digital content that represents a subject within a field of vision associated with the composite camera based on the digital content and the arrangement of the composite camera, wherein the field of vision associated with the composite camera includes at least some of fields of vision associated with the plurality of modular cameras.

In another aspect, a system for generating digital content may include a composite camera that includes a plurality of modular cameras and a processor configured to execute instructions stored on a non-transitory computer readable medium to: receive sensor data representing a subject within a field of vision associated with respective ones of the plurality of modular cameras and one or more geo-spatial characteristics associated with respective ones of the plurality of modular cameras; determine an arrangement of the composite camera based on the sensor data that represents the one or more geo-spatial characteristics associated with the respective ones of the plurality of modular cameras; determine a content type associated with the composite camera based on the arrangement of the composite camera; generate digital content for respective ones of the plurality of modular cameras based on the sensor data that represents a subject within a field of vision associated with the respective ones of the plurality of modular cameras; and generate combined digital content that represents a subject within a field of vision associated with the composite camera based on the digital content, the arrangement of the composite camera, and the content type associated with the composite camera, wherein the field of vision associated with the composite camera includes at least some of fields of vision associated with the plurality of modular cameras.

Variations in these and other aspects, features, elements, implementations, and implementations of the methods, apparatus, procedures, and algorithms disclosed herein are described in further detail hereafter.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 6A-6D generally illustrate examples of composite cameras according to the principles of the present disclosure.

DETAILED DESCRIPTION

Cameras, such as digital modular cameras may be used to capture visual and/or acoustic aspects of a subject within a field of vision associated with a modular camera. A composite camera may include two or more modular cameras composed such one modular camera associated with the composite camera may capture a first perspective of visual and/or acoustic aspects of a subject within a field of vision of the composite camera and another modular camera may capture a second perspective of visual and/or acoustic aspects of the subject within the field of vision of the composite camera. The composite camera may stitch together the first and second perspectives of the visual and/or acoustic aspects of the subject based on a composition, arrangement, and/or position, of the modular cameras.

However, an arrangement of the modular cameras may be unknown and/or subject to adjustment by a user of the composite camera. For example, a composite camera may include two modular cameras. The modular cameras may initially be arranged such that the modular cameras are back-to-back. A user of the composite camera may adjust a position of at least one of the modular cameras such that the modular cameras are subsequently arranged such that the modular cameras are side-to-side. Additionally, or alternatively, composite cameras may be arranged in a wide range of arrangements that may or may not be known to an image processing system associated with the composite camera. The image processing system may be configured to determine an arrangement of the composite camera based on geo-spatial and/or other characteristics associated with the composite camera.

FIG. 1A generally illustrates an example of a modular camera 100 according to the principles of the present disclosure. The modular camera 100 may be an image capture device, such as a digital camera, modular digital camera, a digital video camera, a high resolution digital camera, other suitable image capture device, and/or a combination thereof. The modular camera 100 may be configured to capture visual input of a subject. The subject may include an object, person, landscape, environment, other suitable subject, and/or a combination thereof within a field of vision associated with the modular camera. The modular camera 100 may convert the visual input into digital content, such as a digital image or a digital video.

Figure 1:
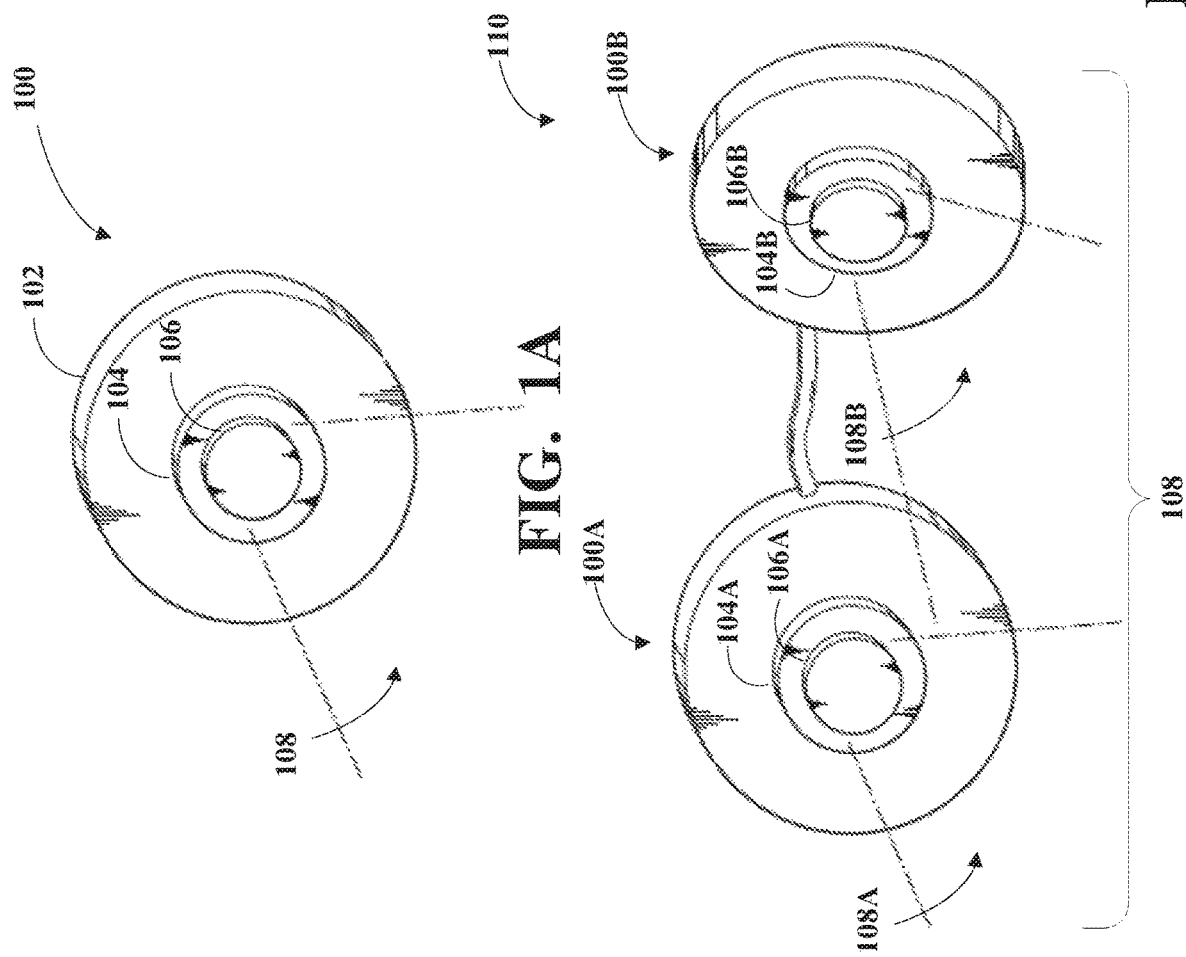
FIG. 1A generally illustrates an example of a modular camera according to the principles of the present disclosure.
FIG. 1B generally illustrates an example of a composite camera according to the principles of the present disclosure.

The modular camera 100 may include a body or chassis 102. The body 102 may house or enclose components of the modular camera 100. The body 102 may comprise a body shape. For example, the body 102 may comprise a circular shape, as shown in FIG. 1, a square shape, a rectangular shape, or any suitable shape.

The body 102 may include a camera mount. The camera mount may be configured to mount the modular camera 100 to a camera holder, frame, or stand, such as a tripod. The modular camera 100 may include a lens system 104. The lens system 104 may be configured to mount, hold, or retain an optical lens element 106. In some implementations, the lens system 104 may be a fixed focal length system, a variable focal length system, a normal lens system, a wide-angle lens system, a long-focus lens system, a telephoto lens system, any other suitable lens system, and/or a combination thereof.

The lens system 104 may include a focal length parameter and a maximum aperture parameter. The lens element 106 may include a glass lens, a plastic lens, or other suitable lens. The lens element 106 may include a convex lens. For example, the lens element 106 may include a front portion and a rear portion. The front portion and the rear portion may convex relative to a center line.

The lens system 104 may include an image sensor. The image sensor may include a charge-couple sensor, a complementary metal-oxide-semiconductor sensor, or other suitable sensor. The image sensor may be configured to capture visual input (e.g., light passing through the lens element 106) associated with a subject positioned within a field of vision 108 of the lens element 106. The modular camera 100 may generate a digital image representing the subject positioned within the field of vision 108 based on the visual input.

FIG. 1B generally illustrates an example of a composite camera 110 according to the principles of the present disclosure. The composite camera 110 may be an image capture device comprising two or more modular cameras. For example, the composite camera 110 may include a modular camera 100A and a modular camera 100B. While only the modular cameras 100A and 100B are shown, the composite camera 110 may include additional modular cameras. For example, the composite camera 110 may include three, four, five, or any suitable number of modular cameras. The composite camera 110 may include a field of vision 108. For example, the field of vision 108 may include fields of vision associated with respective modular cameras associated with the composite camera 110.

The composite camera 110 may generate digital content that represents one or more perspectives of a subject within a field of vision 108 of the composite camera 110. The digital content may include one or more digital images and or one or more digital videos that represent one or more perspectives of a subject within a field of vision of the composite camera 110. For example, the composite camera 110 may generate a 3-dimensional digital video representing a subject within the field of vision of the composite camera 110. For example, the composite camera 110 may combine data from multiple modular cameras to generate one or more digital images and/or one or more digital videos representing multiple perspectives and/or views of the subject. In some implementations, the composite camera 110 may generate digital content for use in virtual reality systems, augmented reality systems, other suitable digital content systems, and/or a combination thereof.

The modular cameras 100A and 100B may include features similar to those described above with respect to the modular camera 100. For example, the modular camera 100A may include a body 102A, a lens system 104A, an optical lens element 106A, and a field of vision 108A. Similarly, the modular camera 100B may include a body 102B, a lens system 104B, an optical lens element 106B, and a field of vision 108B. The modular cameras 100A and 100B may include a communications port, such as a serial port, a parallel port, a universal serial bus port, a fiber optic port, other suitable port, and/or a combination thereof. Additionally, or alternatively, the modular cameras 100A and 100B may include a wireless communications device, such as a WiFi device, a Bluetooth device, a near field communications device, other suitable wireless communications device, and/or a combination thereof.

The modular cameras 100A and 100B may be connected to each other, or otherwise communicate with each other, via a wired and/or wireless connection. For example, the modular camera 100A may be connected or communicate with the modular camera 100B via a wired connection, such as a universal serial bus connection, a fiber optic connection, other suitable wired connection, and/or a combination thereof. Additionally, or alternatively, the modular camera 100A may be connected or communicate with the modular camera 100B via a wireless connection, such as a Bluetooth connection, a WiFi connection, a near field communications connection, other suitable wireless connections, and/or a combination thereof.

In some implementations, and as is generally illustrated, the field of vision 108A may overlap the field of vision 108B. In some implementations, the modular camera 100A may be positioned relative to the modular camera 100B such that the field of vision 108A does not overlap the field of vision 108B.

In some implementations, the lens system 104A may include an image sensor, such as the image sensor described with respect to the modular camera 100. The image sensor associated with the lens system 104A may be configured to capture visual input (e.g., light passing through the lens element 106A) associated with a subject positioned within a field of vision 108A of the lens element 106A.

Additionally, or alternatively, the lens system 104B may include an image sensor, such as the image sensor described with respect to the modular camera 100. The image sensor associated with the lens system 104B may be configured to capture visual input (e.g., light passing through the lens element 106B) associated with a subject positioned within a field of vision 108B of the lens element 106B.

In some implementations, the visual input captured by the image sensor associated with the lens system 104A may include visual input associated with a first perspective of a subject and the visual input captured by the image sensor associated with the lens system 104B may include visual input associated with a second perspective of the subject. For example, the subject may be positioned such that a first portion of the subject is within the field of vision 108 and a second portion of the subject is within the field of vision 108B. In some implementations, the field of vision 108A may overlap the field of vision 108B and a third portion of the subject is within the field of vision 108A and 108B (e.g., where the field of vision 108A overlaps the field of vision 108B). The visual input associated with the first perspective of the subject may include visual input corresponding to the first portion of the subject and at least a portion of the third portion of the subject and the visual input associated with the second perspective of the subject may include visual input corresponding to the second portion of the subject and at least a portion of the third portion of the subject.

In some implementations, the modular camera 100A may be positioned relative to the modular camera 100B such that the field of vision 108A may be near to the field of vision 108B. The visual input associated with the first perspective of the subject may include visual input corresponding to the first portion of the subject and the visual input associated with the second perspective of the subject may include visual input corresponding to the second portion of the subject. The subject may be positioned such that a third portion of the subject within a space between the field of vision 108A and the field of vision 108B.

In some implementations, the composite camera 110 may generate a digital image representing the subject positioned within the field of vision 108 based on the visual input associated with the lens system 104A and the visual input associated with the lens system 104B.

Figure 2:
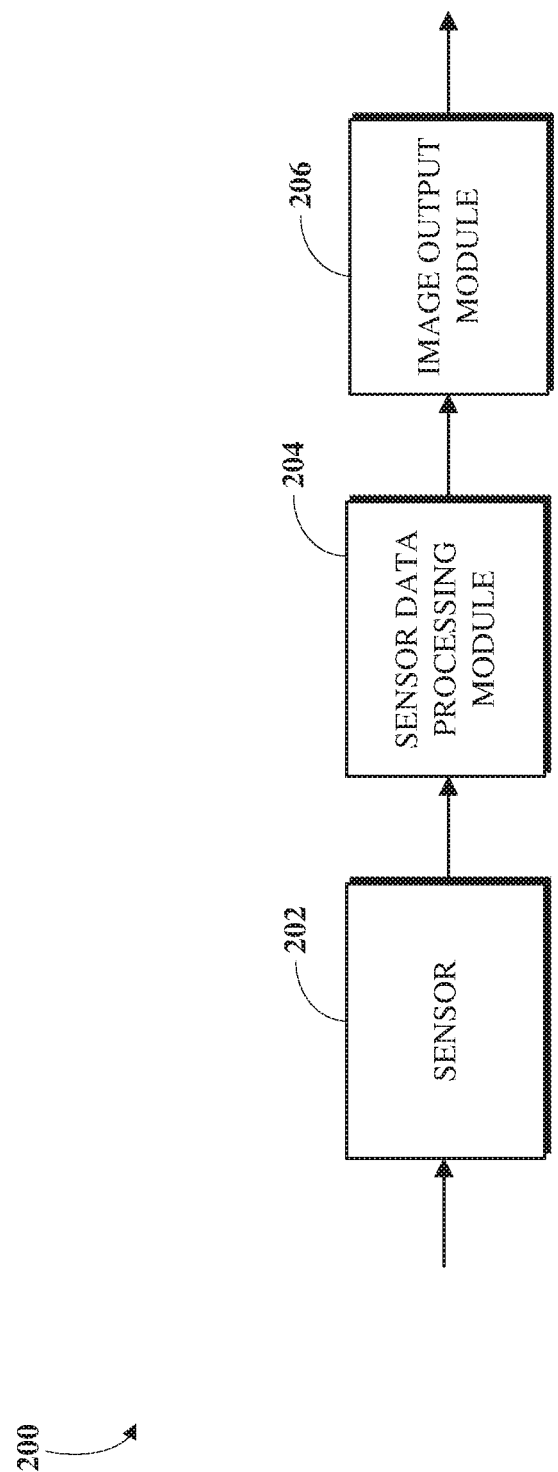
FIG. 2 is a diagram of an example of an image processing system for a modular camera according to the principles of the present disclosure.

FIG. 2 is a diagram of an example of an image processing system 200 for a modular camera according to the principles of the present disclosure. The image processing system 200 may be associated with a modular camera, such as the modular camera 100 of FIG. 1. The image processing system 200 may be configured to capture visual input associated with a subject positioned within the field of vision 108 associated with the modular camera 100. The image processing system 200 may convert the visual input into visual data. The visual data may include electronic signals, electronic charges, binary data, other suitable visual data, and/or a combination thereof that represent the visual input. The image processing system 200 may generate a digital image that represents the subject based on the visual data.

For example, the image processing system 200 may include one or more of sensors 202. The one or more sensors 202 may include one or more image sensors, one or more acoustic sensors, one or more accelerometers, one or more gyroscopes, one or more magnetometers, a global positioning system, other suitable sensors, and/or a combination thereof. A sensor 202 may be configured to capture or sense sensor input associated with modular camera 100 For example, a sensor 202 may include an image sensor as described above with respect to FIG. 1 and an acoustic sensor. The sensor 202 may be configured to capture sensor input associated with the modular camera 100. The sensor input may include visual input (e.g., light passing through the lens element 106) associated with a subject positioned within a field of vision 108 of the lens element 106, acoustic input (e.g., audible sound) associated with the subject positioned within the field of vision 108, and/or a combination thereof. The sensor 202 may communicate the sensor input to a sensor data processing module 204.

In some implementations, the sensor data processing module 204 may receive sensor input from one or more sensors 202. The sensor data processing module 204 may be configured to convert the sensor input into sensor data, such as electronic signals, electronic charges, binary data, other suitable sensor data, and/or a combination thereof that represent the sensor input. The sensor data processing module 204 may communicate the sensor data to an image output module 206. Additionally, or alternatively, the sensor data processing module 204 may store the sensor data in a memory associated with the modular camera 100.

The image output module 206 may be configured to receive the sensor data. Additionally, or alternatively, the image output module 206 may be configured to access sensor data stored in the memory associated with the modular camera 100. The image output module 206 may process the sensor data. For example, the image output module 206 may generate one or more digital images that represent the subject positioned within the field of vision 108 of the modular camera 100 based on sensor data representing sensor input associated with the subject. The image output module 206 may generate the one or more digital images using conventional digital image processing techniques.

In some implementations, the image output module 206 may generate one or more digital videos that represent a subject positioned within the field of vision 108 of the modular camera 100 based on sensor data representing sensor input associated with the subject. The image output module 206 may generate the one or more digital videos using conventional digital video processing techniques. For example, the image output module 206 may process sensor data representing visual input associated with a subject within the field of vision 108 and sensor data representing acoustic input associated with the subject. The image output module 206 may generate a digital video representing the visual input and acoustic input associated with the subject.

The image output module 206 may store the one or more digital images and/or the one or more digital videos on a memory associated with the modular camera 100. Additionally, or alternatively, the image output module 206 may communicate the one or more digital images and/or the one or more digital videos to a computing device, such as a laptop computer, a desktop computer, a tablet computer, a smartphone, other handheld computing devices, other modular cameras, other composite cameras, other suitable computing devices, and/or a combination thereof. The computing device may include software, such as digital image processing software, digital imaging editing software, digital video processing software, digital video editing software, other suitable software, and/or a combination thereof. In some implementations, the computing device may be configured to store one or more digital images, one or more digital videos, and/or a combination thereof on a server. For example, the computing device may store and/or save one or more digital images, one or more digital videos, and/or a combination thereof to a cloud storage server. In some implementations, the computing device may be configured to post one or more digital images, one or more digital videos, and/or a combination thereof to a social media network.

Figure 3:
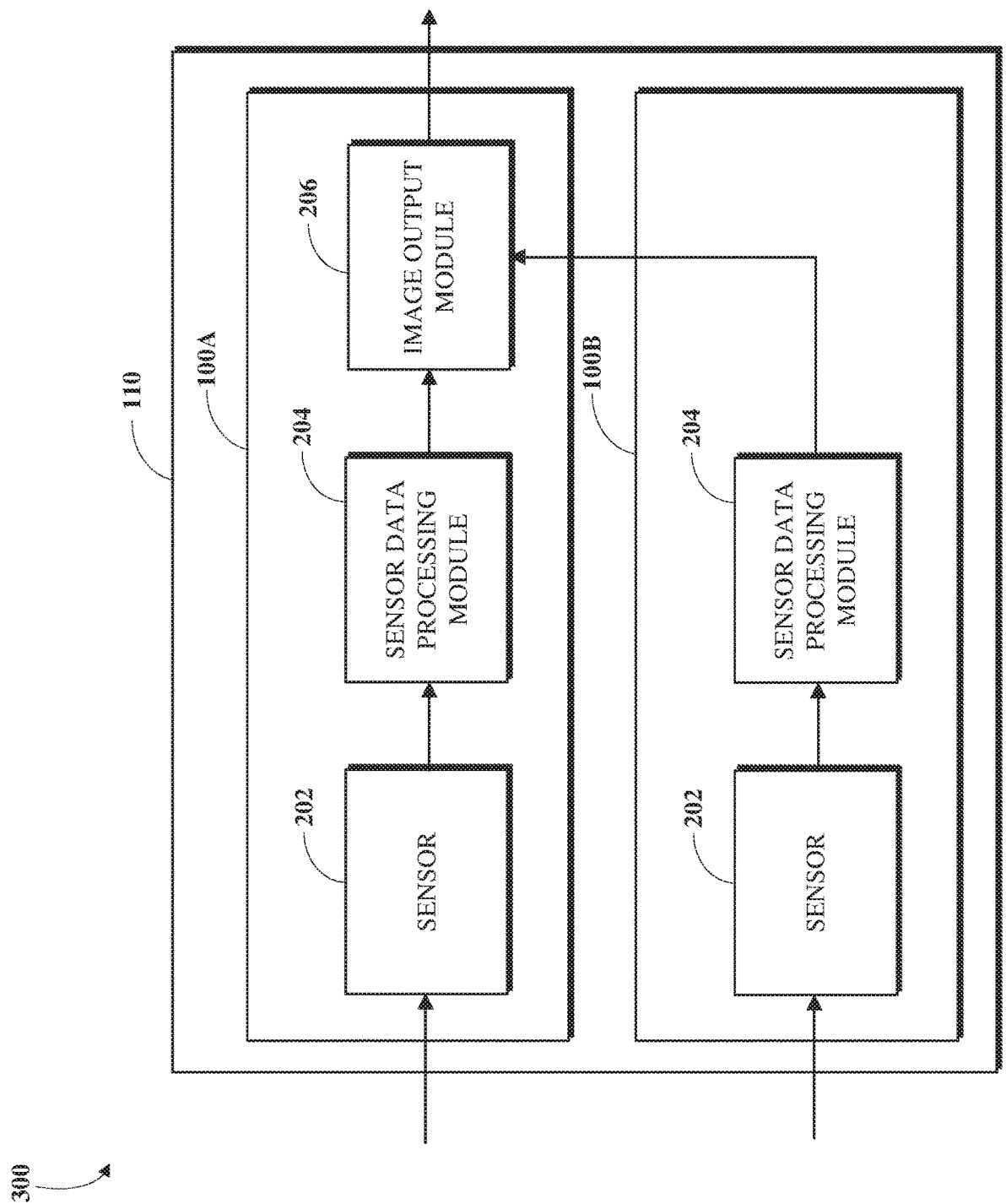
FIG. 3 is a diagram of an example of an image processing system for a composite camera according to the principles of the present disclosure.

FIG. 3 is a diagram of an example of an image processing system 300 for a composite camera, such as the composite camera 110 shown in FIG. 1B, according to the principles of the present disclosure. As described above, a composite camera may be an image capture device comprising two or more modular cameras. For example, the composite camera 110 may include the modular camera 100A and the modular camera 100B, as shown in FIG. 1B. While only two modular cameras are described, a composite camera may include any suitable number of modular cameras. The modular cameras 100A and 100B may include a sensor 202 and a sensor 204 as described above with respect to FIG. 2. In some implementations, one of the modular camera 100A and the modular camera 100B may include an image output module 206 as described above with respect to FIG. 2. For example, as illustrated in FIG. 3, the modular camera 100A may include the image output module 206 and the modular camera 100B may omit the image output module 206. In some implementations, the modular camera 100A may omit the image output module 206 and the modular camera 100B may include the image output module 206.

As described above, the sensor data processing modules 204 may receive sensor input from respective sensors 202. The sensor data processing modules 204 may generate sensor data representing sensor input received from respective sensors 202. The sensor data may represent visual aspects of a subject within a field of vision of the composite camera 110, acoustic aspects of a subject within the field of vision of the composite camera 110, geo-spatial aspects of respective modular cameras associated with the composite camera 110, other characteristics of the modular cameras and/or the composite camera 110, other suitable aspects of the subject, the modular cameras, and/or the composite camera 110, and/or a combination thereof.

In some implementations, the sensor data processing module 204 associated with the modular camera 100A may communicate sensor data to the image output module 206, as described above. The sensor data processing module 204 associated with the modular camera 100B may communicate sensor data to the image output module 206 via a communications connection between the modular camera 100A and the modular camera 100B. For example, as described above, the modular camera 100A may communicate with the modular camera 100B via a wired and/or wireless connection, such as those described above with respect to FIG. 1B.

In some implementations, the image output module 206 may combine one or more digital images based on at least some sensor data associated with the modular camera 100A (e.g., received from the sensor data processing module 204 associated with the modular camera 100A) and at least some sensor data associated with the modular camera 100B (e.g., received from the sensor data processing module 204 associated with the modular camera 100B). For example, the image output module 206 may receive sensor data that represents visual input associated with a first perspective of a subject within the field of vision 108A (e.g., associated with the modular camera 100A). The image output module 206 may receive sensor data that represents visual input associated with a second perspective of the subject within the field of vision 108B (e.g., associated with the modular camera 100B). The image output module 206 may stitch, assemble, correlate, combine, and/or associate the sensor data associated with the first perspective with the sensor data associated with the second perspective. The image output module 206 may generate one or more digital images that represents the first perspective and the second perspective of the subject based on the sensor data associated with the first perspective and the sensor data associated with the second perspective.

In some implementations, the image output module 206 may generate one or more digital videos based on at least some sensor data associated with the modular camera 100A (e.g., received from the sensor data processing module 204 associated with the modular camera 100A) and at least some sensor data associated with the modular camera 100B (e.g., received from the sensor data processing module 204 associated with the modular camera 100B). For example, as described, the image output module 206 may generate one or more images that represent a first perspective of a subject within the field of vision 108A. The image output module 206 may generate a digital video representing the first perspective of the subject based on the one or more digital images representing the first perspective of the subject. For example, the image output module 206 may stitch, assemble, correlate, combine and/or associate digital images representing the first perspective of the subject according to a temporal order of the digital images. As described above, the image output module 206 may receive sensor data that represents acoustic input associated with the first perspective of the subject. The image output module 206 may generate a sound track for the digital video by correlating and/or associating the sensor data representing the acoustic input with the digital video that represents the first perspective of the subject.

The image output module 206 may generate one or more images that represent a second perspective of the subject within the field of vision 108B. The image output module 206 may generate a digital video representing the second perspective of the subject based on the one or more digital images representing the second perspective of the subject. For example, the image output module 206 may stitch, assemble, correlate, combine and/or associate digital images representing the second perspective of the subject according to a temporal order of the digital images. As described above, the image output module 206 may receive sensor data that represents acoustic input associated with the second perspective of the subject. The image output module 206 may generate a sound track for the digital video by correlating and/or associating the sensor data representing the acoustic input with the digital video that represents the second perspective of the subject.

In some implementations, the image output module 206 may generate a single combined digital video that represents the first and second perspectives of the subject. For example, the image output module 206 may stitch, assemble, correlate, combine and/or associate a digital video, and associated sound track, representing the first perspective of the subject with a digital video, and associated sound track, representing the second perspective of the subject. The image output module 206 may generate the combined digital video using conventional digital video assembly techniques.

In some implementations, the image output module 206 may generate a 3-dimensional digital video representing a 3-dimensional perspective and/or view of the subject, a 360-degree perspective and/or view of the subject, other suitable perspectives and/or views of the subject, and/or a combination thereof based on one or more digital videos representing the two or more perspectives of the subject with in the field of vision of the composite camera 110. In some implementations, the image output module 206 may communicate a combined video representing a multiple perspectives of a subject within the field of vision 108 of the composite camera 110 to a computing device, such as the computing device described above. In some implementations, the image output module 206 may communicate one or more videos representing a respective perspective of a subject within the field of vision 108 of the composite camera 110 to a computing device, such as the computing device described above. The computing device may include software configured to stitch, assemble, correlate, combine and/or associate digital videos representing respective perspectives of the subject into a single combined video representing the multiple perspectives of the subject.

Figure 4:
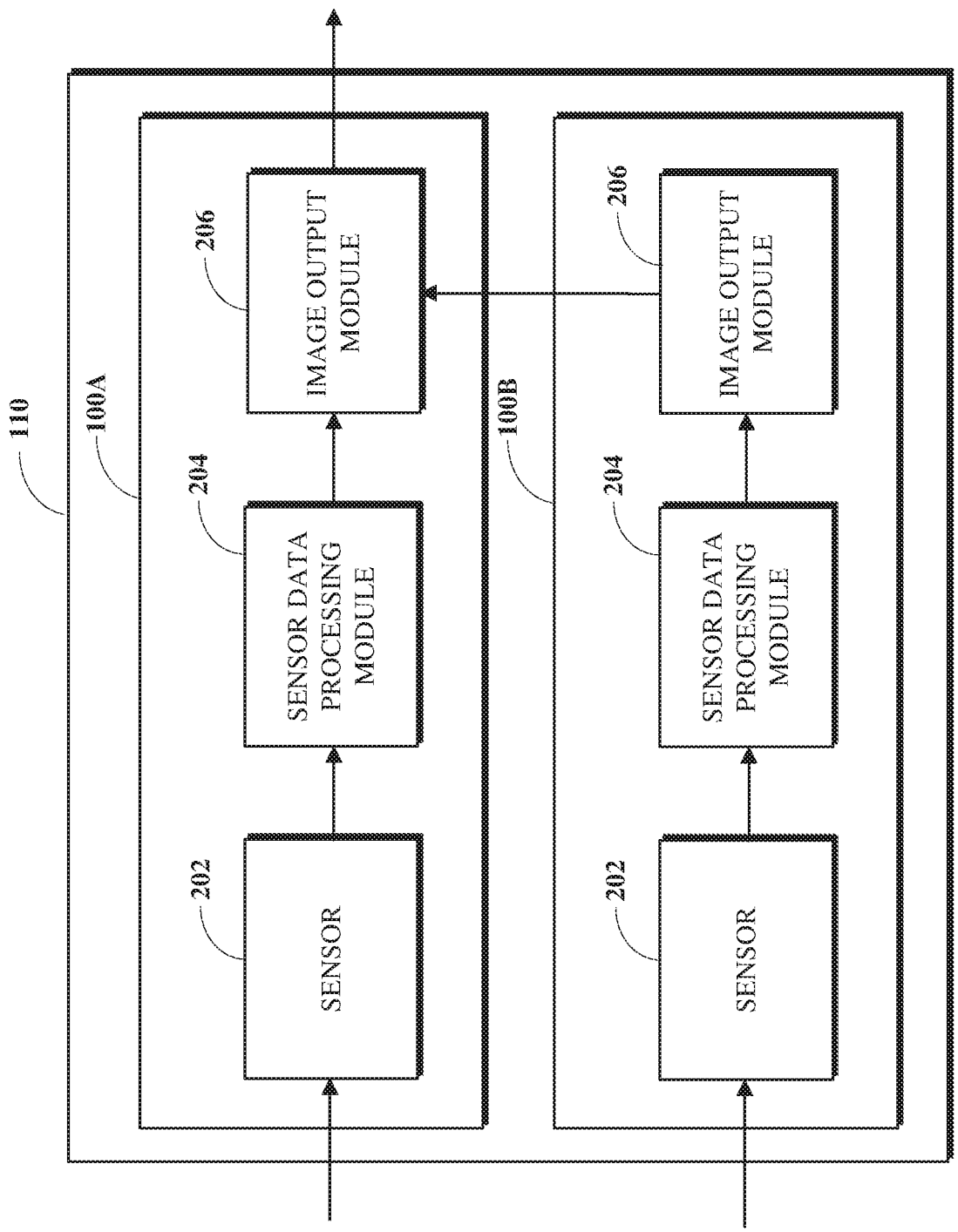
FIG. 4 is a diagram of an example of an image processing system for a composite camera according to the principles of the present disclosure.

In some implementations, each modular camera associated with a composite camera may include an image output module 206. For example, as is generally illustrated in FIG. 4, a composite camera, such as the composite camera 110, may include two or more modular cameras. For example, the composite camera 110 as illustrated in FIG. 4 may include the modular camera 100A and the modular camera 100B. Each of the modular cameras 100A and 100B may include a sensor 202, a sensor data processing module 204, and an image output module 206. In some implementations, one of the image output modules 206 associated with one of the modular cameras may act as a primary image output module 206 while other image output modules 206 associated with other modular cameras may act as secondary image output modules 206. For example, the image output module 206 associated with the modular camera 100A may act as the primary image output module 206 while the image output module 206 associated with the modular camera 100B may act as a secondary image output module 206.

In some implementations, the primary image output module 206 may receive sensor data from a corresponding sensor data processing module 204 (e.g., the sensor data processing module 204 associated with the modular camera 100A) and one or more digital images and/or one or more digital videos from one or more secondary image output modules 206 (e.g., a secondary image output module 206 associated with the modular camera 100B). The primary image output module 206 may generate one or more digital images and/or one or more digital videos that represent multiple perspectives of a subject within the field of vision 108 of a corresponding composite camera (e.g., the composite camera 110), as described above, based on the sensor data received from the corresponding sensor data processing module 204 and the one or more digital images and/or one or more digital videos received from the one or more secondary image output module 206.

Figure 5:
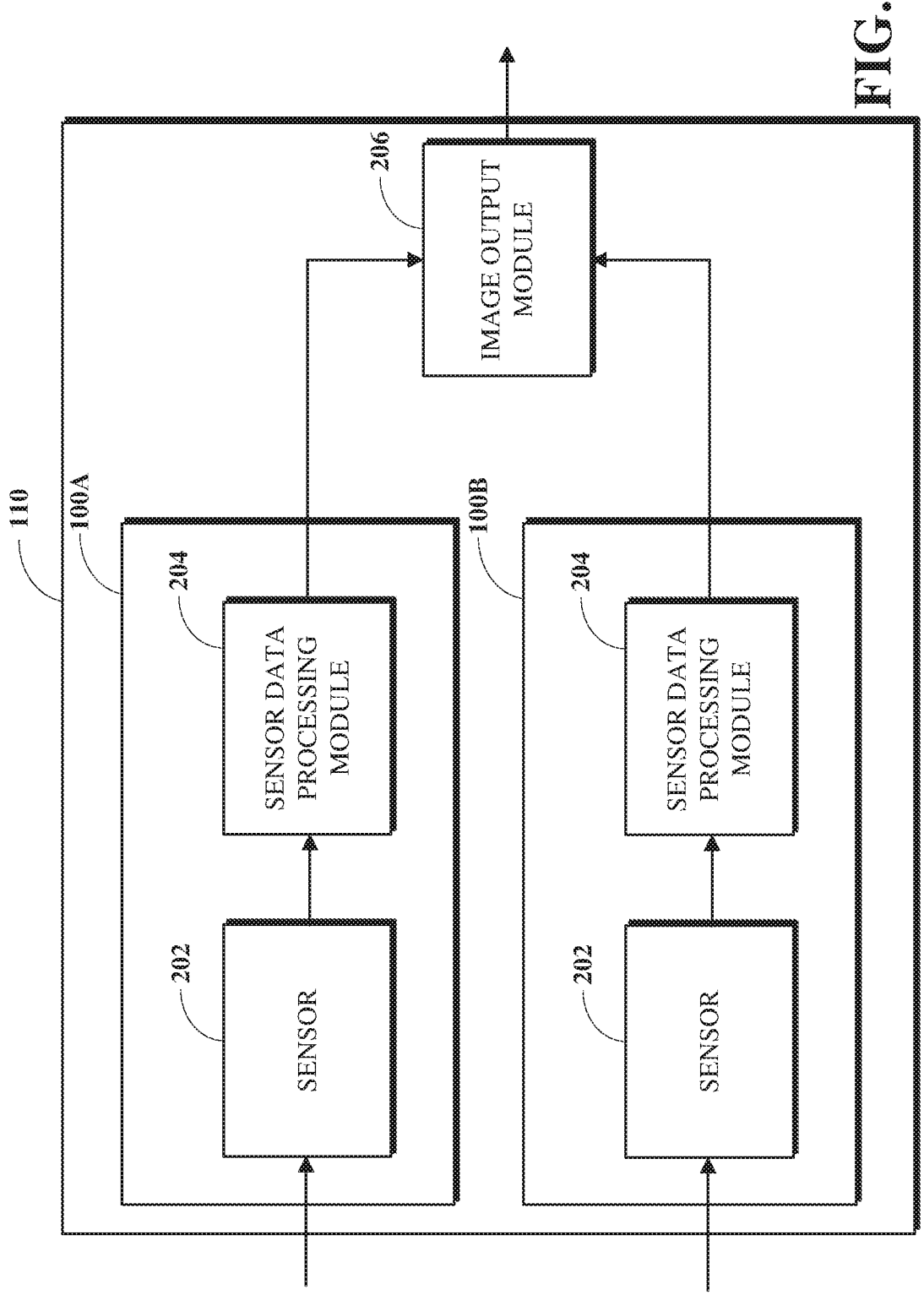
FIG. 5 is a diagram of an example of an image processing system for a composite camera according to the principles of the present disclosure.

In some implementations, each modular camera associated with a composite camera may omit an image output module 206. For example, as is generally illustrated in FIG. 5, a composite camera, such as the composite camera 110, may include two or more modular cameras. For example, the composite camera 110 as illustrated in FIG. 5 may include the modular camera 100A and the modular camera 100B. Each of the modular cameras 100A and 100B may include a sensor 202 and a sensor data processing module 204. The composite camera 110 may include an image output module 206. Alternatively, the image output module 206 may be omitted from the composite camera 110. For example, the image output module 206 may be associated with a computing device remotely located from the composite camera 110 (e.g., a computing device that is connects via a wire and/or wirelessly to the composite camera 110).

In some implementations, the image output module 206 may receive sensor data from sensor data processing modules 204 associated with the modular cameras associated with the composite camera. For example, the image output module 206 may receive sensor data from the sensor data processing module 204 associated with the modular camera 100A and sensor data from the sensor data processing module 204 associated with the modular camera 100B. The image output module 206 may generate one or more digital images and/or one or more digital videos that represent multiple perspectives of a subject within the field of vision 108 of a corresponding composite camera (e.g., the composite camera 110) based on the sensor data received from the sensor data processing modules 204, as described above.

In some implementations, an image processing system, such as the image processing system 300 illustrated in FIG. 3, the image processing system illustrated in FIG. 4, and/or the image processing system illustrated in FIG. 5, may determine a composition of modular cameras associated with a composite camera. A composition may include an arrangement of the modular cameras.

An arrangement of modular cameras associated with the composite camera may include: a position of each of the modular cameras associated with the composite camera relative each other; a position of each of the modular cameras relative to a fixed point, such as, a center line of the composite camera, the ground, other suitable fixed points, and/or a combination thereof; other suitable arrangements; and/or a combination thereof. For example, FIG. 6A generally illustrates a composite camera 600A including two modular cameras having a back-to-back arrangement. Each of the modular cameras may be positioned such that a lens system 602 associated with each of the modular cameras may be parallel to each other (e.g., parallel to a center line 604 associated with the composite camera 600A) and such that the lens systems 602 are generally aligned.

FIG. 6B generally illustrates a composite camera 600B including two modular cameras having a side-by-side arrangement. Each of the modular cameras may be positioned such that a lens system 602 associated with each of the modular cameras may be perpendicular relative to a center line 604 and such that the lens systems 602 are generally aligned.

FIG. 6C generally illustrates a composite camera 600C including three modular cameras having a multiple side-by-side at one level arrangement. Each of the modular cameras may be positioned such that each modular camera is at an angle relative to a center line 604 and such that lens systems 602 associated with each modular camera are generally aligned relative to a center line 606. In some implementations, the modular cameras associated with the composite camera 600C may be aligned relative to each other around a center axis.

FIG. 6D generally illustrates a composite camera 600D including a plurality of modular cameras having a multiple side-by-side at multiple levels arrangement. Each modular camera may be positioned such that a lens system 602 associated with each of the modular cameras may be at an angle relative to a center line 604 and a center line 606. In some implementations, the modular cameras associated with the composite camera 600D may be arranged in a substantially spherical shape, such that, the fields of vision associated with respective modular cameras combine to form a substantially 360-degree field of vision associated with the composite camera 600D.

In some implementations, a composite camera may include modular cameras associated with a composite camera may include one or more attachment components. The attachment components may include hinges, clips, other suitable attachment components, and/or a combination thereof. A modular camera, associated with a composite camera, may be attached to one or more other modular cameras via respective attachment components. In some implementations, an attachment component associated with a first modular camera may be configured to receive an attachment component associated with a second modular component. The first modular camera may be attached, or secured, to the second modular component when the attachment component associated with the first modular camera receives the attachment component associated with the second modular camera.

Figure 7A:
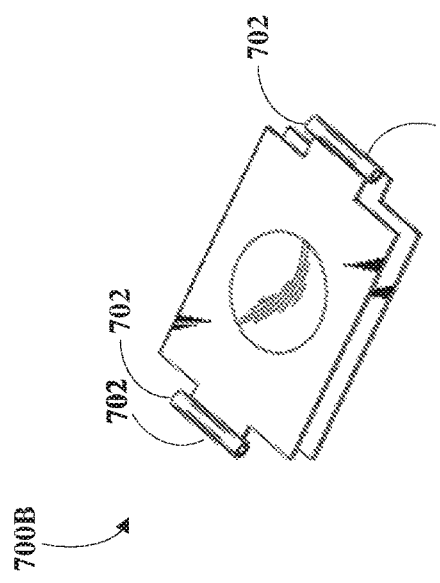
FIGS. 7A-7D generally illustrate examples of composite cameras according to the principles of the present disclosure.
Figure 7B:
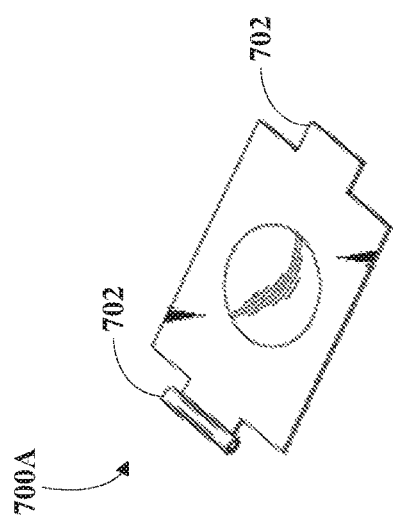

FIG. 7A generally illustrates a modular camera 700A. The modular camera 700A may include one or more attachment components 702. FIG. 7B generally illustrates a composite camera 700B including two modular cameras having a back-to-back arrangement. The modular cameras associated with the composite camera 700B may be attached to each other via attachment components 702.

Figure 7C:
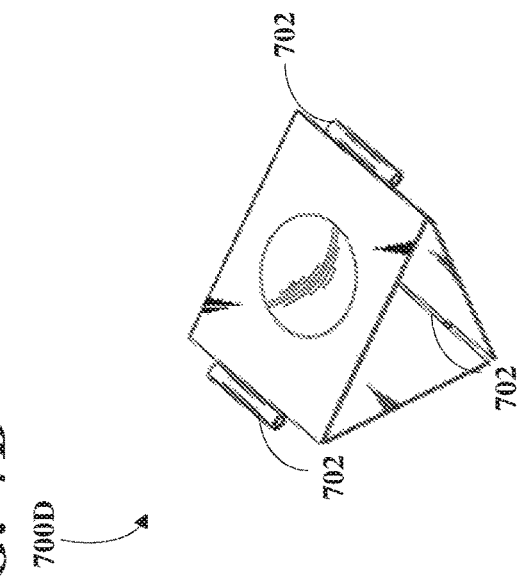
Figure 7D:
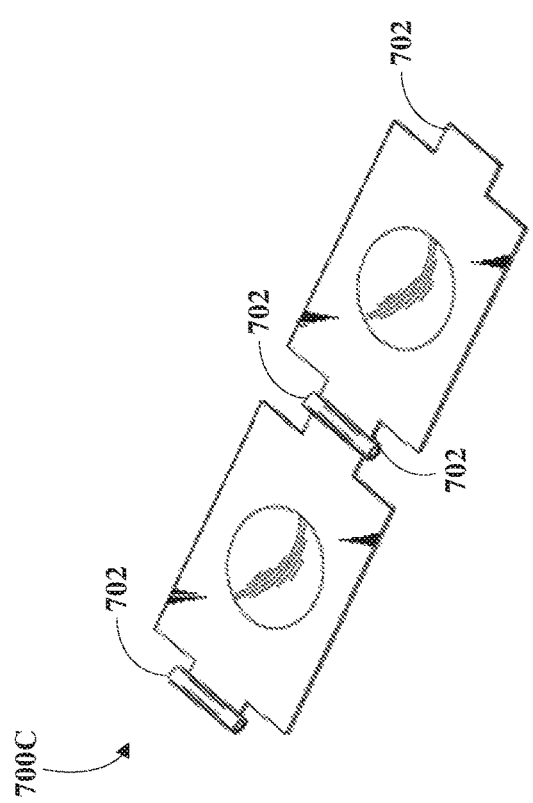

FIG. 7C generally illustrates a composite camera 700C including two modular cameras having a side-by-side arrangement. The modular cameras associated with the composite camera 700C may be attached to each other via attachment components 702. FIG. 7D generally illustrates a composite camera 700D including three modular cameras having a multiple side-by-side at one level arrangement. The modular cameras associated with the composite camera 700D may be attached to each other via attachment components 702.

Figure 8:
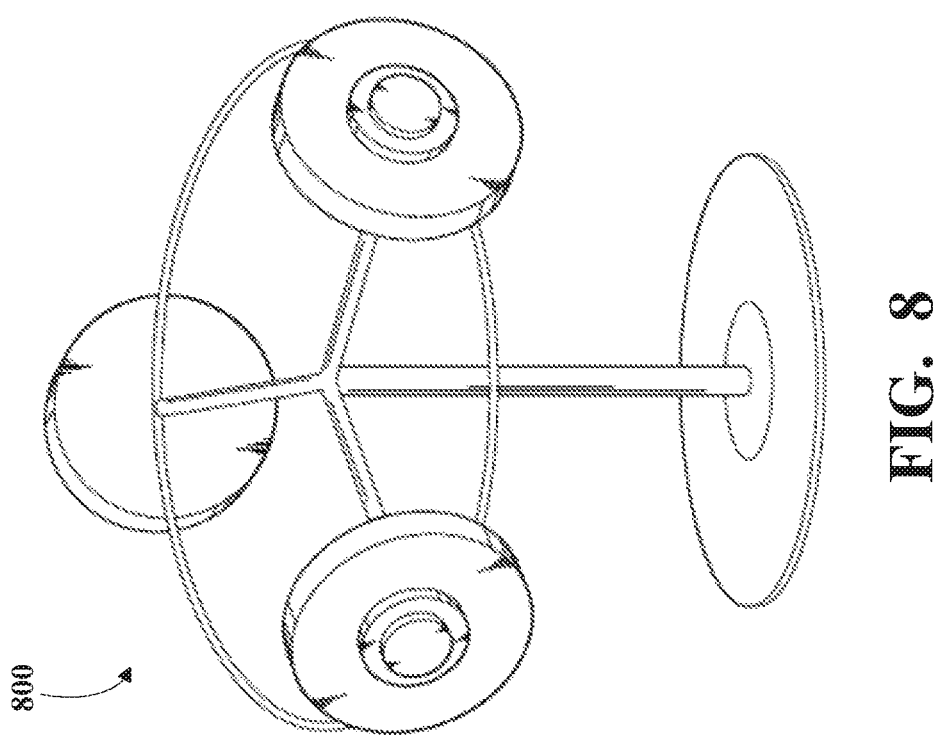
FIG. 8 generally illustrates an example of a composite camera according to the principles of the present disclosure.

FIG. 8 generally illustrates a composite camera 800. The composite camera 800 may include a plurality of modular cameras disposed on an external device, such as a frame (e.g., a wire frame or other suitable frame). Each modular camera may be attached to the frame via attachment components. While a circular frame is shown, the composite camera may be arranged in any suitable arrangement. While limited camera arrangements are illustrated in FIGS. 6A-6D, 7A-7D, and 8 a composite camera according to the principles of the present disclosure may be arranged in any suitable arrangement.

In some implementations, an image output module 206 associated with a composite camera (e.g., the image output module 206 of FIG. 3, the primary image output module 206 of FIG. 4, the image output module 206 of FIG. 5, or other suitable image output module 206) may determine an arrangement associated with the composite camera (e.g., the composite camera 110). For example, as descried above, each modular camera associated with the composite camera 110 may include one or more sensors 202. In some implementations, the composite camera 110 may include additional sensors 202 than those described herein. The sensors 202 may include one or more image sensors, one or more acoustic sensors, one or more accelerometers, one or more gyroscopes, one or more magnetometers, a global positioning system, other suitable sensors, and/or a combination thereof. The sensors 202 may communicate sensor input, such as a rotational motion of respective modular cameras, a position or angle of respective modular cameras relative to a fixed point, a global position of respective modular cameras, other suitable sensor input, and/or a combination thereof to respective sensor data processing modules 204.

The sensor data processing modules 204 may communicate sensor data representing the sensor input to the image output module 206. Additionally, or alternatively, the sensor data processing modules 204 may store the sensor data on a memory associated with the composite camera 110. The image output module 206 may receive the sensor data and/or access the sensor data, as described above. The image output module 206 may determine an arrangement of the composite camera based on the sensor data. For example, the image output module 206 may compare values associated with the sensor data with stored values. The stored values may correspond to an arrangement. The stored values may be stored in a database on a memory associated with the composite camera 110. Additionally, or alternatively, the stored values may be stored in a file and/or a database on a computing device associated with the composite camera 110.

The image output module 206 may identify stored values that are the same or substantially similar to values associated with the sensor data. For example, the sensor data may indicate that a first modular camera is at a first angle relative to a center line associated with the composite camera 110 and that a second camera is at a second angle relative to the center line. The image output module 206 may determine that the composite camera 110 includes two modular cameras having a first arrangement based on the sensor data. The first arrangement may correspond to an arrangement associated with stored values that are the same or substantially similar to the first angle and the second angle. For example, the first arrangement may include a back-to-back arrangement when the sensor data indicates that the first modular camera is substantially parallel to the center line and the second modular parallel and on an opposite side of the center line.

In some implementations, the image output module 206 may generate one or more digital images and/or one or more digital videos based on the sensor data. The image output module 206 may generate one or more combined digital images and/or one or more combined digital videos based on the one or more digital images and/or the one or more digital videos and a determined arrangement of the composite camera 110. For example, as described above, the image output module 206 may stitch, assemble, correlate, and/or associate digital images representing respective perspectives of a subject within respective fields of vision associated with the modular cameras associated with the composite camera 110. The image output module 206 may identify digital images to stitch together based on a temporal aspect (e.g., a time stamp) associated with respective digital images and the arrangement of the composite camera. For example, the image output module 206 may identify digital images captured at the same or substantially the same time from respective modular cameras. The image output module 206 may stitch the digital images together based on the arrangement. For example, the arrangement of the composite camera 110 may include a multiple side-by-side at multiple levels arrangement. The image output module 206 may stitch the digital images together such that a combined digital image may represent a 360-degree view of a subject within the field of vision 108 of the composite camera 110. The image output module 206 may generate one or more combined digital videos based on the one or more combined digital images as described above. For example, the image output module 206 may generate a combined digital video that represents a 360-degree view of a subject within the field of vision 108 of the composite camera 110 based on the one or more combined digital images.

In some implementations, the image output module 206 may determine a type of digital content to generate based on a determined arrangement of the composite camera 110. For example, the digital content may include a 3-dimensional view of a subject within the field of vision 108 of the composite camera 110, a 360-degree view of a subject within the field of vision of the composite camera 110, a back-to-back view of a subject within the field of vision 108 of the composite camera 110, a side-by-side view of a subject within the field of vision 108 of the composite camera 110, other suitable digital content views, and/or a combination thereof. For example, the image output module 206 may determine to generate a 360-degree view of a subject within the field of vision 108 of the composite camera 110 when the image output module 206 determines the arrangement of the composite camera 110 is a multiple side-by-side at multiple levels arrangement.

Figure 9:
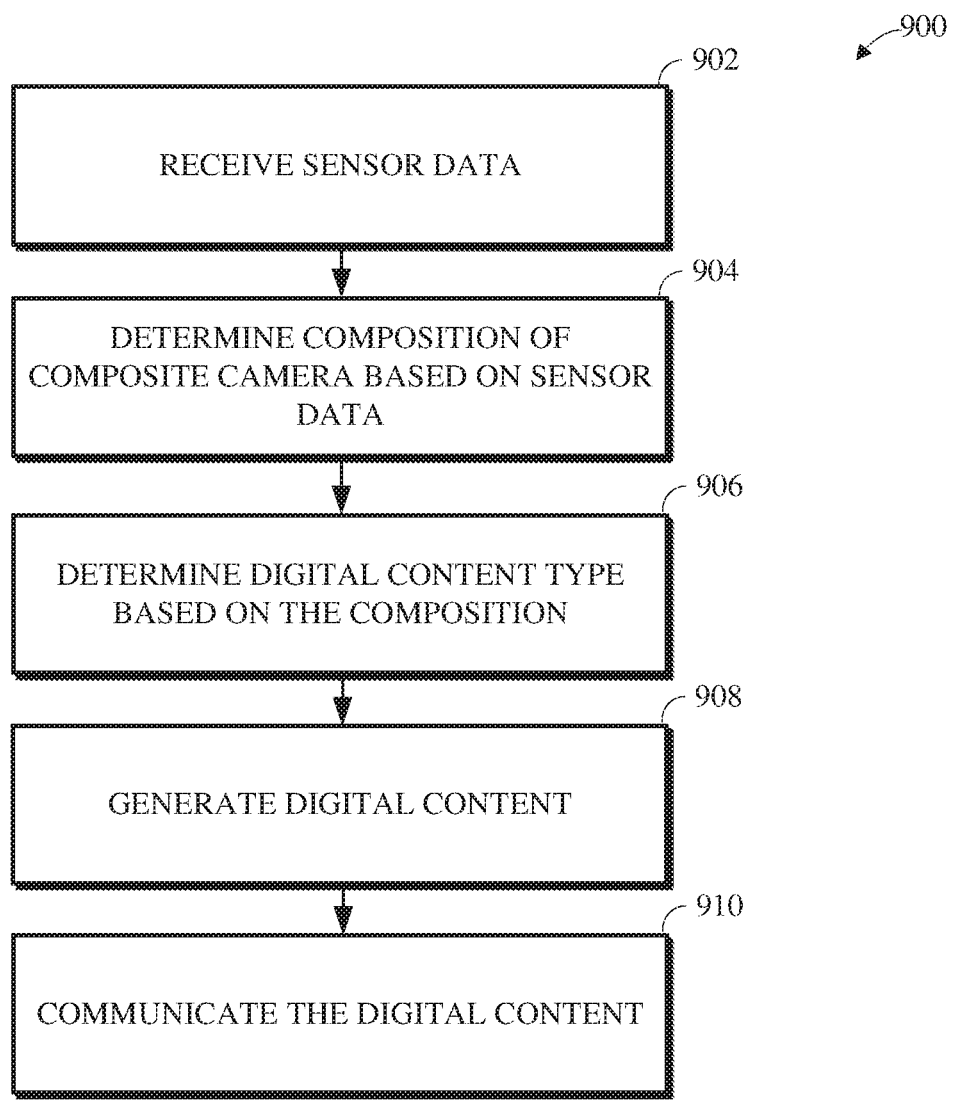
FIG. 9 is a flow diagram of a method for image processing for a composite camera according to the principles of the present disclosure.

FIG. 9 is a flow diagram of a method 900 for image processing for a composite camera according to the principles of the present disclosure. A portion of the entirety of the method 900 may be implemented by a system that includes some or all of the features of at least one of: a sensor 202 shown in FIGS. 2-5, a sensor data processing module 204 shown in FIGS. 2-5, and an image output module 206 shown in FIGS. 2-5.

In some implementations, the method 900 may include: receiving sensor data at operation 902; determining an arrangement of a composite camera based on the sensor data at operation 904, determining a digital content type based on the arrangement at operation 906; generating digital content at operation 908; communicating the digital content at operation 910; and/or a combination thereof.

At operation 902, the method 900 may receive sensor data. For example, as described above, a composite camera, for example, the composite camera 110, may include one or more modular cameras. For example, the composite camera 110 may include the modular camera 110A and the modular camera 100B. The modular cameras 100A and 100B may include one or more sensors. For example, the modular camera 100A may include one or more sensors 202 and the modular camera 100B may include one or more sensors 202 as described above. The one or more sensors 202 may receive sensor input as described above. The one or more sensors 202 may communicate the sensor input to respective sensor data processing modules 204 associated with respective modular cameras. The sensor data processing modules 204 may generate sensor data that represents respective sensor input as described above. The sensor data processing modules 204 may communicate the sensor data to one or more image output modules 206 associated with the composite camera 110.

In some implementations, the sensor data processing modules 204 may communicate the sensor data to an image output module 206, as described with respect to FIG. 3. In some implementations, the sensor data processing modules 204 may communicate the sensor data to respective image output modules 206, as described with respect to FIG. 4. In some implementations, the sensor data processing modules 204 may communicate the sensor data to an image output module 206 that is remotely associated with the modular cameras associated with the composite camera 110, as described with respect to FIG. 5. In some implementations, the sensor data processing modules 204 may store the sensor data on a memory associated with the composite camera 110.

At operation 904, the method 900 may determine an arrangement of the composite camera 110 based on the sensor data. For example, as described above an image output module 206 associated with the composite camera 110 may determine an arrangement of the modular cameras associated with the composite camera 110 based on the sensor data.

At operation 906, the method 900 may determine a digital content type associated with the composite camera based on the arrangement. For example, as described above, the image output module 206 may determine a digital content type based on the determined arrangement. For example, the image output module 206 may determine that the digital content type includes a 360-degree digital video representing a subject within the field of vision 108 of the composite camera 110 when the image output module 206 determines the arrangement includes a multiple side-by-side at multiple levels arrangement.

At operation 908, the method 900 may generate digital content. For example, as described above, the image output module 206 may generate digital content that represents a subject within a field of vision 108 of the composite camera 110 based on the sensor data, the determined arrangement, the digital content type, and/or a combination thereof.

At operation 910, the method 900 may communicate the digital content. For example, as described above, the image output module 206 may communicate the generated digital content to one or more computing devices. The one or more computing devices may include a laptop computer, a desktop computer, a tablet computer, a smartphone, other modular cameras, other composite cameras, other handheld computing devices, other suitable computing devices, and/or a combination thereof.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, and/or a combination thereof. The hardware can include, for example, computers, intellectual property (IP) cores, application-specific integrated circuits (ASIC s), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array, (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC) or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

While the disclosure has been described in connection with certain implementations or embodiments, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for generating digital content, comprising:
    a composite camera that includes a plurality of modular cameras that are movable relative to each other so that the plurality of modular cameras are movable between a back-to-back configuration and a side-to-side configuration; and
    a processor configured to execute instructions stored on a non-transitory computer readable medium to:
        receive sensor data representing a subject within a field of vision associated with respective ones of the plurality of modular cameras and one or more geo-spatial characteristics associated with respective ones of the plurality of modular cameras;
        determine an arrangement of the composite camera based on the sensor data that represents the one or more geo-spatial characteristics associated with the respective ones of the plurality of modular cameras;
        generate digital content for respective ones of the plurality of modular cameras based on the sensor data that represents a subject within a field of vision associated with the respective ones of the plurality of modular cameras; and
        generate combined digital content that represents a subject within a field of vision associated with the composite camera based on the digital content and the arrangement of the composite camera, wherein the field of vision associated with the composite camera includes at least some of fields of vision associated with the plurality of modular cameras;
    wherein the field of view of the plurality of cameras is combinable to create a 3-dimensional perspective or a 360-degree field of vision;
    wherein the plurality of modular cameras include multiple modular cameras located side-by-side at one level and each of the plurality of modular cameras extend at an angle relative to a centerline; and
    wherein the plurality of modular cameras each include one or more attachment components that connect each of the plurality of modular cameras together and permit for movement of the plurality of modular cameras between the back-to-back configuration and the side-by-side configuration.

2. The apparatus of claim 1, wherein the digital content for respective ones of the plurality of modular cameras includes one or more digital images that represent the subject with in the field of vision associated with the respective ones of the plurality of modular cameras.

3. The apparatus of claim 1, wherein the combined digital content includes one or more digital images that represent the subject within the field of vision associated with the composite camera.

4. The apparatus of claim 1, wherein the combined digital content includes one or more digital videos that represent the subject within the field of vision associated with the composite camera.

5. The apparatus of claim 1, wherein the processor is configured to execute instructions stored on the non-transitory computer readable medium to generate digital content that includes a first perspective of a subject within the field of vision associated with the composite camera.

6. The apparatus of claim 5, wherein the processor is configured to execute instructions stored on the non-transitory computer readable medium to generate digital content that includes a second perspective of the subject within the field of vision associated with the composite camera.

7. The apparatus of claim 6, wherein the processor is configured to execute instructions stored on the non-transitory computer readable medium to generate combined digital content that represents the first perspective and the second perspective of the subject within the field of vision associated with the composite camera.

8. The apparatus of claim 1, wherein the apparatus includes an image output module that stitches digital images together so that the digital images that are stitched together create the 360-degree field of vision.

9. The apparatus of claim 1, wherein the plurality of modular cameras include a body, a lens system, and an optical lens element.

10. The apparatus of claim 9, wherein the plurality of modular cameras include a communication port and a wireless communication device.

11. A method for generating digital content, comprising:
    moving one or more of a plurality of modular cameras between a back-to-back configuration and a side-by-side configuration;
    receiving sensor data representing a subject within a field of vision associated with the plurality of modular cameras associated with a composite camera and one or more geo-spatial characteristics associated with the plurality of modular cameras;
    determining an arrangement of the composite camera based on the sensor data that represents the one or more geo-spatial characteristics associated with the plurality of modular cameras;
    generating digital content from the plurality of modular cameras based on the sensor data that represents a subject within the field of vision associated with the plurality of modular cameras; and
    generating combined digital content that represents the subject within the field of vision associated with the composite camera based on the digital content and the arrangement of the composite camera, wherein the field of vision of the composite camera is a 3-dimensional perspective or a 360-degree field of vision; and wherein each of the plurality of modular cameras include one or more attachment components that connect each of the plurality of modular cameras together and permit for movement of the plurality of modular cameras between the back-to-back configuration and the side-by-side configuration and the plurality of cameras in the side by-side configuration includes multiple cameras located side-by-side at one level and each of the plurality of modular cameras extend at an angle relative to a centerline.

12. The method of claim 11, wherein the digital content for respective ones of the plurality of modular cameras includes one or more digital images that represent the subject with in the field of vision associated with the respective ones of the plurality of modular cameras.

13. The method of claim 11, wherein the combined digital content includes one or more digital images that represent the subject within the field of vision associated with the composite camera.

14. The method of claim 11, wherein the combined digital content includes one or more digital videos that represent the subject within the field of vision associated with the composite camera.

15. The method of claim 11, further comprising generating digital content that includes a first perspective of a subject within the field of vision associated with the composite camera.

16. The method of claim 15, further comprising generating digital content that includes a second perspective of the subject within the field of vision associated with the composite camera.

17. The method of claim 16, further comprising generating combined digital content that represents the first perspective and the second perspective of the subject within the field of vision associated with the composite camera.

18. The method of claim 11, comprising stitching digital images together with an image output module to create the 3-dimensional perspective or the 360-degree field of vision, and communicating with a tablet or smartphone via the image output module.

19. The method of claim 18, wherein the 3-dimensional perspective or the 360-degree field of vision are generated in a virtual reality system or augmented reality system.

20. The method of claim 11, wherein the plurality of modular cameras include a body, a lens system, an optical lens element a communication port, and a wireless communication device.

* * * * *